US012342267B2

(12) United States Patent
Kalra et al.

(10) Patent No.: US 12,342,267 B2
(45) Date of Patent: Jun. 24, 2025

(54) NETWORK SLICE SELECTION IN A WIRELESS TELECOMMUNICATIONS NETWORK

(71) Applicant: Telefonaktiebolaget LM Ericsson (publ), Stockholm (SE)

(72) Inventors: Amit Kalra, Gurgaon (IN); Ashish Gupta, Delhi (IN); Himanshu Arora, Faridabad (IN); Mukesh Kumar, New Delhi (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 560 days.

(21) Appl. No.: 17/433,205

(22) PCT Filed: Feb. 27, 2019

(86) PCT No.: PCT/IN2019/050158
§ 371 (c)(1),
(2) Date: Aug. 23, 2021

(87) PCT Pub. No.: WO2020/174482
PCT Pub. Date: Sep. 3, 2020

(65) Prior Publication Data
US 2022/0141762 A1 May 5, 2022

(51) Int. Cl.
*H04W 48/18* (2009.01)
*H04W 24/02* (2009.01)
(Continued)

(52) U.S. Cl.
CPC .......... *H04W 48/18* (2013.01); *H04W 24/02* (2013.01); *H04W 24/10* (2013.01); *H04W 60/04* (2013.01)

(58) Field of Classification Search
CPC ..... H04W 24/02; H04W 24/10; H04W 48/18; H04W 60/00; H04W 60/04; H04W 76/10; H04W 8/18
See application file for complete search history.

(56) References Cited

U.S. PATENT DOCUMENTS

| 9,961,624 B1 | 5/2018 | Zait | |
|---|---|---|---|
| 2010/0128677 A1* | 5/2010 | Liu | H04W 24/08 370/328 |

(Continued)

FOREIGN PATENT DOCUMENTS

WO 2017074486 A1 5/2017

OTHER PUBLICATIONS

International Search Report and Written Opinion of the International Searching Authority for PCT International Application No. PCT/IN2019/050158 dated Jun. 4, 2019.
(Continued)

*Primary Examiner* — Stephen J Clawson
(74) *Attorney, Agent, or Firm* — Sage Patent Group (57) ABSTRACT

A method for selecting a network slice in a wireless telecommunications network having a plurality of network slices is disclosed. The method comprises receiving a network request originating from a user equipment, UE, the network request comprising a user identification, ID, associated with the user equipment, obtaining a user profile associated with the user ID, the user profile comprising a service pattern associated with the user ID, and selecting one network slice from the plurality of network slices for the UE based at least partly on the received network request, the obtained user profile, and the slice characteristic of each network slice.

19 Claims, 4 Drawing Sheets

(51) Int. Cl.
*H04W 24/10* (2009.01)
*H04W 60/04* (2009.01)

(56) References Cited

U.S. PATENT DOCUMENTS

| | | | | |
|---|---|---|---|---|
| 2010/0130170 A1* | 5/2010 | Liu | ............... | H04W 64/00 |
| | | | | 455/418 |
| 2013/0102277 A1* | 4/2013 | Stenfelt | ............ | H04W 4/24 |
| | | | | 455/406 |
| 2017/0086118 A1 | 3/2017 | Vrzic | | |
| 2017/0142591 A1 | 5/2017 | Vrzic | | |
| 2017/0164212 A1 | 6/2017 | Opsenica et al. | | |
| 2017/0303259 A1* | 10/2017 | Lee | ............... | H04W 28/16 |
| 2018/0234915 A1* | 8/2018 | Zait | ............... | H04W 48/16 |
| 2019/0364492 A1* | 11/2019 | Azizi | ............. | H04W 4/021 |
| 2020/0112868 A1* | 4/2020 | Shariat | ............ | H04W 48/17 |
| 2022/0217610 A1* | 7/2022 | Zheng | .......... | H04L 41/0895 |

OTHER PUBLICATIONS

Prados-Garzon et al., "A Complete LTE Mathematical Framework for the Network Slice Planning of the EPC," IEEE Transactions on Mobile Computing ( vol. 19, Issue: 1) Jan. 7, 2019, pp. 1-14.
GSMA, "An Introduction to Network Slicing," GSMA document, Jan. 2020, 20 pages.
Extended European Search Report for EP Patent Application No. 19917192.7, mailed Aug. 12, 2022, 21 pages.
Samsung, NEC, "Updates to UE driven analytics solution 16," SA WG2 Meeting #129BIS, S2-1812274, Nov. 26-30, 2018, West Palm Beach, USA, 6 pages.
ZTE Corporation, "Discussion on RAN related parameters collected from UE," 3GPP TSG-RAN WG2 Meeting #105, R2-1901999, Feb. 25-Mar. 1, 2019, Athens, Greece, 4 pages.
3GPP TSG-SA2 Meeting #127-Bis, "NSSF uses NWDAF's Service to select network slice(s)," S2-184732, May 28-Jun. 1, 2018, Newport Beach, USA, 4 pages.
3GPP TR 23.791 V16.0.0, "3rd Generation Partnership Project; Technical Specification Group Services and System Aspects; Study of Enablers for Network Automation for 5G (Release 16)," Dec. 2018, 121 pages.

* cited by examiner

NETWORK SLICE SELECTION IN A WIRELESS TELECOMMUNICATIONS NETWORK

CROSS REFERENCE TO RELATED APPLICATION

This application is a 35 U.S.C. § 371 national stage application of PCT International Application No. PCT/IN2019/050158 filed on Feb. 27, 2019, the disclosure and content of which is incorporated by reference herein in its entirety.

TECHNICAL FIELD

The present disclosure relates to the field of communications networks, and in particular to network slice selection.

BACKGROUND

As smart phones and other portable devices increasingly become ubiquitous, and data usage increases, macrocell base station devices and existing wireless infrastructure in turn require higher bandwidth capability in order to address the increased demand. Future wireless communications systems (such as 5G and LTE Advanced Pro) are therefore required to provide increased bandwidth and reduced latencies compared to current system. In more detail, the predictable features of 5G technology, such as high date rate, low latency, mass devices connection and low power consumption, will play a crucial role in the future society, even though the related technologies are still not finalized Further, different devices will have different requirements regarding services and features, and, thus, there is a strong emphasis in 5G to optimally utilize the available resources/services so that the high demand from the connecting devices can be met. Making use of network slices using technologies like network function virtualization (NFV) and software defined networks (SDN) will help in achieving this goal.

In more detail, network slices are isolated portions of the network that may be instantiated from dedicated underlying hardware. Each network slice in the communication network may fulfil different requirements of specific services and features. For example, as specified in 3GPP 23.501, there has been given example of network slices corresponding to eMBB (slice suitable for enhanced mobile broadband), URLLC (slice suitable for the handling of ultra-reliable low latency communications), and MIoT (slice suitable for massive IoT). In this way, the network slicing helps to increase the efficiencies of physical infrastructures, and provide flexibility in the types of services that may be offered to different users.

Presently known solutions disclose different mechanisms to select a network slice for a user in 5G network. However, none of those known mechanisms are able to choose the optimum network slices from the plurality of available network slices. Thus, there exists a need to have a mechanism that will ensure the selection of optimum network slice so that different user devices may be served by the network slices that are most suitable for those user devices, which in turn will result into better utilization of underlying infrastructure.

SUMMARY

It is therefore an object of the present disclosure to provide a method for selecting a network slice in a wireless telecommunications network having a plurality of network slices, a non-transitory computer-readable storage medium, a network slice selection component, and a wireless telecommunications network, which alleviates all or at least some of the above-discussed drawbacks of presently known solutions.

This and other objects are achieved by means of a method, a non-transitory computer-readable storage medium, a network slice selection component, and a wireless telecommunications network as defined in the appended claims. The term exemplary is in the present context to be understood as serving as an instance, example or illustration.

According to a first aspect of the present disclosure, there is provided a method for selecting a network slice in a wireless telecommunications network having a plurality of network slices. Each network slice has a slice characteristic and is associated with a defined portion of a core network of the wireless telecommunications network. The method comprises receiving a network request originating from a user equipment (UE). The network request comprises a user identification (user ID) associated with the user equipment. The method further comprises obtaining a user profile associated with the user ID, where the user profile comprises a service pattern associated with the user ID. Further, the method comprises selecting one network slice from the plurality of network slices for the UE based at least partly on the received network request, the obtained user profile, and the slice characteristic of each network slice.

In other words, in the proposed solution the user profile (e.g. usage pattern in terms of data download requirements or general data usage pattern) is considered while allocating the network slice to the user. The service pattern for the user is suitably determined based on the historical data associated with the user ID. The network function network data analytics function (NWDAF) that is currently expected to provide load level information to other consumer network functions (e.g. policy control function (PCF) or network slice selection function NSSF) may be enriched with such information related to usage pattern associated with the user device. The network function NSSF may then accordingly fetch such information from NWDAF and utilize this information to select the optimum network slice for the user device.

By means of the proposed solution one can increase the chances that a user will be assigned a network slice amongst plurality of network slices that is optimum for that specific user. In this way, since requirements of the user are aligned with the selected network slice, it will be more probable that user will have an improved user experience while accessing the network services. In addition, since the network slice can be optimally utilized by all users, underlying infrastructure can be used in optimal way, which will lead to increased efficiency of network resources that is one of the primary objectives of the general network slicing concept.

According to one exemplary embodiment of the present disclosure, the service pattern is obtained from a predefined network function, such as e.g. a Network Data Analytics Function (NWDAF) enriched with user/subscriber history data. Subscriber or user history in terms of network activity can form a good basis for estimating/determining a service pattern of the user, whereby an optimal network slice selection can be performed.

Further, according to another exemplary embodiment of the present disclosure, the user profile comprises a plurality of service patterns associated with the user ID, each service pattern being further associated with a defined time period for the user ID. In other words, the service patterns are provided with time tags, such as e.g. time of day, day of the week, date of the month, so that one can identify different service patterns in different time periods.

It is envisioned that there might be significant difference in feature/functions requirements from UEs at different interval of times (e.g. different requirements in different hours of the day, different days of the week or different dates of a month), Thus, in order to handle this potentially problematic situation one can consider the plurality of service patterns associated with the user ID while selecting the network slice so that the user may be allocated to a network slice that would be most optimal for it at that specific instant of time.

Further, according to a second aspect of the present disclosure, there is provided a non-transitory computer-readable storage medium storing one or more programs configured to be executed by one or more processors of a network function, the one or more programs comprising instructions for performing the method according to any one of the embodiments disclosed herein. With this aspect of the disclosure, similar advantages and preferred features are present as in the previously discussed first aspect of the disclosure.

Still further, according to a third aspect of the present disclosure, there is provided a network slice selection component comprising at least one communication interface, at least one memory, and at least one processor. The processor is configured to execute instructions stored in the memory to select a network slice in a wireless telecommunications network having a plurality of network slices. Each network slice is associated with a defined portion of a core network of the wireless telecommunications network and each network slice has a slice characteristic. More specifically, the processor is configured to receive a network request originating from a UE. The network request comprises a user identification (user ID) associated with the UE. The processor is further configured to obtain a user profile associated with the user ID, where the user profile comprises a service pattern associated with the user ID, and select one network slice from the plurality of network slices for the user equipment based at least partly on the received network registration request, the obtained user profile, and the slice characteristic of each network slice. With this aspect of the disclosure, similar advantages and preferred features are present as in the previously discussed first aspect of the disclosure.

Further, according to an exemplary embodiment, the network slice selection component is implemented in a NSSF of the wireless telecommunications network.

Further, according to another exemplary embodiment, the network slice selection component is implemented in an AMF of the wireless telecommunications network.

Still further, according to a fourth aspect of the present disclosure, there is provided a wireless telecommunication system. The wireless telecommunication system comprises a first network component. The first network component is arranged to receive a network request from a user equipment, UE, where the network request comprises a user ID associated with the UE, and to send a network slice selection request to a second network component based on the received network request. Further the wireless telecommunications network comprises a second network component. The second network component is arranged to receive the network slice selection request, and obtain a user profile associated with the user ID from a third network component, where the user profile comprising a service pattern associated with the user ID. Moreover, the second network component is arranged to select one network slice from a plurality of network slices for the UE. Each network slice is associated with a defined portion of a core network of the wireless telecommunications system and each network slice has a slice characteristic. The selection of one network slice is based at least partly on the received network slice selection request, the obtained user profile, and the slice characteristic of each network slice. Further, the second network component is arranged to s end a network slice instance ID to the first network component based on the selected network slice. With this aspect of the disclosure, similar advantages and preferred features are present as in the previously discussed first aspect of the disclosure.

Further embodiments of the disclosure are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present disclosure will in the following be further clarified with reference to the embodiments described hereinafter.

BRIEF DESCRIPTION OF THE DRAWINGS

Further objects, features and advantages of embodiments of the disclosure will appear from the following detailed description, reference being made to the accompanying drawings, in which.

DETAILED DESCRIPTION

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

Figure 1:
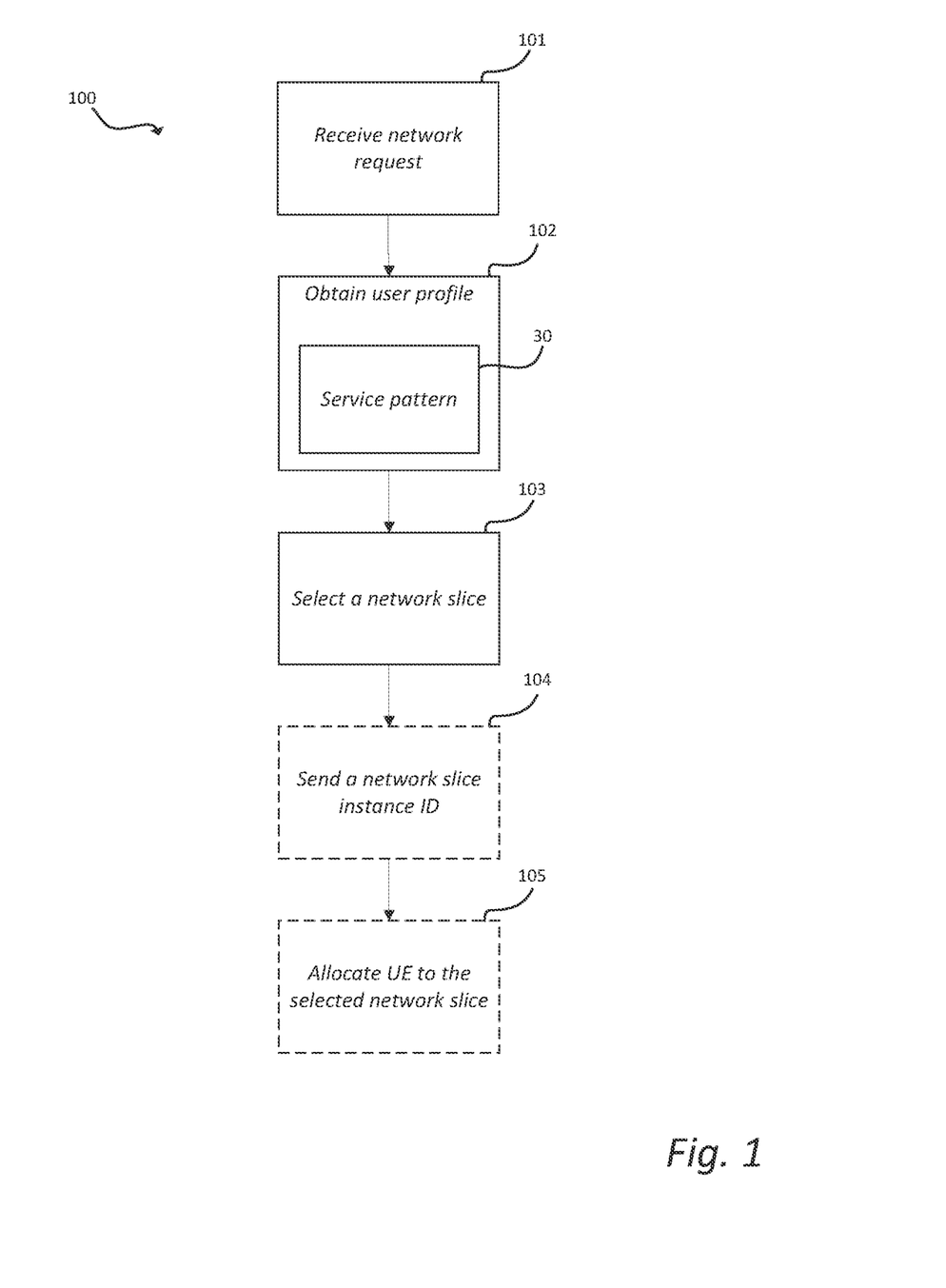
FIG. 1 is a flow chart representation of a method for selecting a network slice in a wireless telecommunications network having a plurality of network slices according to an embodiment of the present disclosure.

FIG. 1 illustrates a flow chart representation of a method 100 for selecting a network slice in a wireless telecommunications network having a plurality of network slices. Each network slice of the plurality of network slices has a specific slice characteristic, and is associated with a defined portion of a core network of the wireless telecommunications network. A slice characteristic may for example be that the network slice is suitable for extreme data download requirements, suitable for low data download requirements, suitable for a high number of sessions requirements. Thus, in other words, the slice characteristics define connectivity in terms of data rate, bandwidth, latency, Quality of Service (QoS), security, availability, and other suitable parameters.

The method comprises receiving 101 a network request originating from a user equipment (UE). The network request may for example be an initial network registration request or re-registration request trigger due to e.g. mobility, periodic registration, or other causes. The network request may for example be communicated from the UE, via a (radio) access network ((R)AN) to an access management function (AMF). The (R)AN may communicate with the AMF over a communication interface as specified in available 3rd Generation Partnership Project (3GPP) documentation. Moreover, the network request includes a user identification (user ID) associated with the UE. Accordingly, the network request may be provided in accordance with LTE or 5G standard protocols and may indicate the International Mobile Equipment Identity (IMEI) of the UE and an International Mobile Subscriber Identity (IMSI) associated with the UE.

The network request may also include an Access Point Name (APN) and a Mobile Country Code/Mobile Network Code (MCC/MNC). It is assumed in this example that the UE is subscribed for services with the wireless telecommunication network, and that the subscriber profile and/or other information associated with the UE is accessible from a subscriber information database. Thus, the method 100 further comprises obtaining 102 or receiving 102 a user profile (may also be referred to as a subscriber profile) associated with the user ID.

Furthermore, the network request may include a requested Single Network Slice Selection Assistance Information (S-NSSAI), which corresponds to the network slice(s) to which the UE wishes to register. For example, the UE may include slice/service type (SST) request in the S-NSSAI to indicate that preference is to select slice corresponding to enhanced Mobile Broadband (eMBB). The (R)AN may select an AMF using the Requested NSSAI included in the network (registration) message or, if it is unable to select an AMF based on the requested NSSAI, it will route the message to an AMF from a set of default AMFs. As readily understood by the skilled reader, the handling of registration requests with different scenarios (e.g. when Requested NSSAI is not present in the registration message) is already available in standard 3GPP documentation (e.g. 3GPP 23.501) and need not be further elaborated upon.

The user profile includes a service pattern 30 associated with the user ID. The service pattern can for example include one or more parameters/values indicative of a data usage pattern for the user ID. In more detail, the service pattern may for example comprise information about one or more of an average data download for the user ID, an average duration of a voice or data session for the user ID, an average number of voice or data sessions for a time period for the user ID, an average latency offered for the user ID, and historical types of data sessions (e.g. video streaming, VR, gaming, Internet of Things (IoT) applications (e.g. home automation, industrial control), etc.) of the user ID. The services pattern may for example be obtained/received 102 from a predefined network function, such as e.g. a Network Data Analytics Function (NWDAF) enriched with user/subscriber history data.

Further, the method 100 comprises selecting 103 a network slice from the plurality of network slices for the UE. The selection 103 being based at least partly on the received network request (e.g. containing the S-NSSAI), the obtained/received 102 user profile (containing the service pattern) and the slice characteristic of each network slice.

Moving on, the method 100 may further comprise sending 104 a network slice instance ID to a network component (e.g. the AMF) of the wireless telecommunications network based on the selected network slice. Accordingly, the method 100 may further comprise a step of allocating 105 the UE to the selected network slice (i.e. based on the network slice instance ID).

Figure 2:
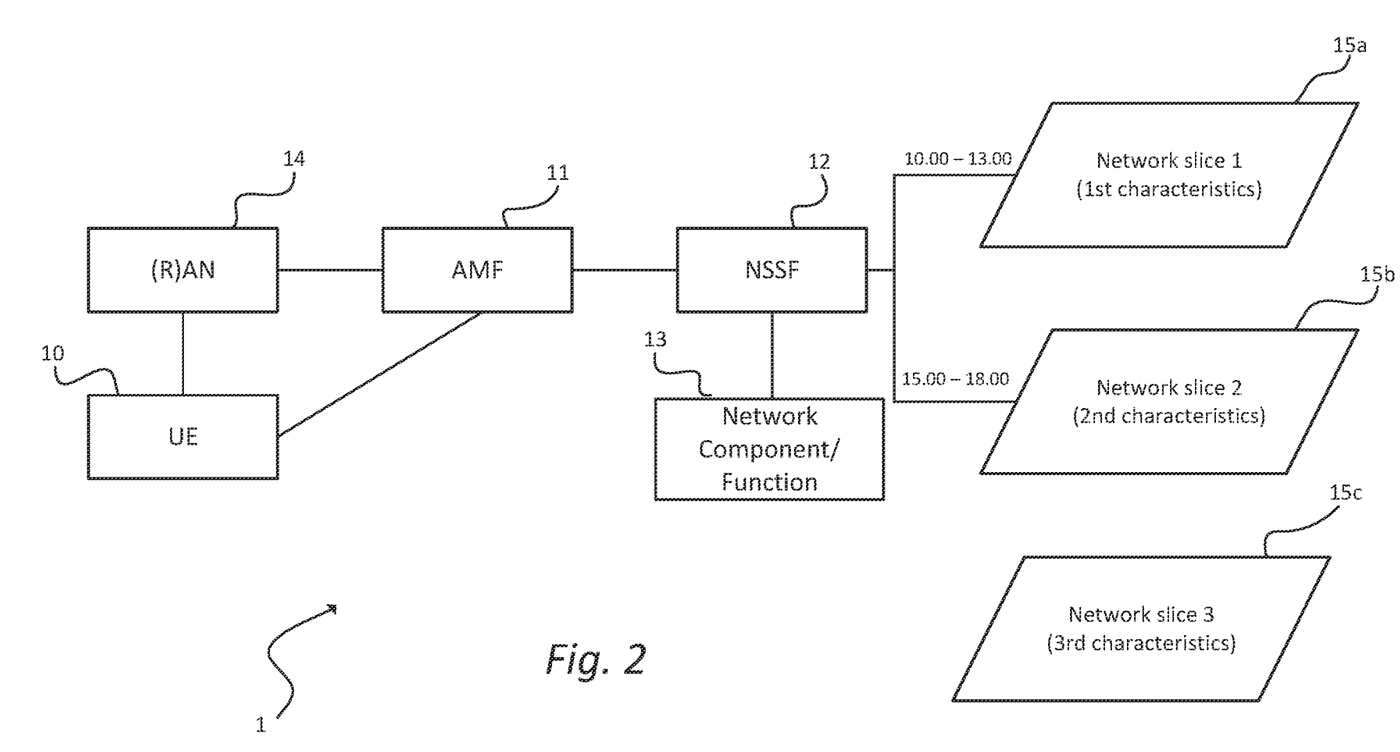
FIG. 2 is a schematic block diagram representation of an architecture of a wireless telecommunications network according to an embodiment of the present disclosure.

FIG. 2 illustrates a schematic architecture of a wireless telecommunication system 1 according to an exemplary embodiment of the present disclosure. Illustrated is a user device (UE) 10 that wants to register itself in the network (e.g. 5G network) through a (R)AN 14 by sending a network request. As mentioned in the foregoing, the registration may be an initial registration or a re-registration. The wireless telecommunication system 1 comprises a first network component 11 arranged to receive a network request originating from a UE 10, where the network request comprises a user ID associated with the UE 10. In more detail, the (R)AN may communicate with the AMF via an interface as specified in available 3GPP documentation.

The illustrated architecture, i.e. the components 10, 11, 12, 13, 14, and their conventional functions are considered to be readily understood by the skilled artisan as they are known from known 5G network architectures, and will therefore, for the sake of brevity and conciseness not be discussed in any particular detail in the present disclosure.

In the illustrated system 1 of FIG. 2, for registration in the network the UE 10 will send a network request towards the (R)AN 14. In the network request (e.g. registration message) the UE 10 sends requested Network Slice Selection Assistance Information (NSSAI) containing the Single Network Slice Selection Assistance Information (S-NSSAI) corresponding to the slice(s) to which the UE 10 wishes to register. For example, the UE 10 may include SST=<integer> in the S-NSSAI to indicate that preference is to select slice corresponding to enhanced Mobile Broadband (eMBB) (e.g. network slice 1 15a).

Accordingly, the (R)AN may select an AMF 11 using the requested NSSAI included in the network request, or, if it is unable to select an AMF based on the requested NSSAI, it will route the message to an AMF from a set of default AMFs. It would be understood that the handling of registration request with different scenarios (e.g. when requested NSSAI is not present in the network request) is readily understood by the skilled reader and available in standard 3GPP documentation (e.g. 3GPP 23.501).

Once, the AMF 11 has received the network request, it can decide that the network slice selection function (NSSF) 12 needs to be queried. Thus, the first network component (e.g. AMF) 11 is arranged to send a network slice selection request to a second network component (e.g. NSSF) based on the received network request. In more detail, the AMF 11 passes on relevant information (e.g. request NSSAI, mapping of request NSSAI to Home Public Land Mobile Network (HPLMN)S-NSSAI, the subscribed S-NSSAI, etc.) to the NSSF 12. The NSSF 12 is arranged to receive the network slice selection request, and select a network slice for the UE 10.

For example, in conventional solutions, the NSSF may determine that the network slice configured for enhanced mobile broadband (eMBB) is allowed for the UE 10, and the UE can be directed towards this network slice. Similarly, the NSSF can determine target AMFs 11 or network repository functions (NRFs). However, according to an exemplary embodiment of the present disclosure, a network operator can configure multiple network slices 15a, 15b, 15c capable of providing eMBB.

In the illustrated embodiment of the present disclosure, the network operator has provisioned three network slices 15a, 15b, 15c for eMBB to cater to three different groups of UEs. That is, a first network slice 15a is configured to be utilized by users that have high demands in data download. A second network slice 15b is configured to be utilized by users having a low demand in terms of data download, and a third network slice 15c is configured to be utilized by users that have high demands in terms of the number of sessions required by the UE 10. Thus, according to the present disclosure, it is proposed that an optimal network slice 15a, 15b, 15c is selected for the UE 10. In other words, the NSSF 12 is arranged to retrieve or obtain additional information from a network component (e.g. an NWDAF) to aid in the selection of the most optimal network slice (out of the three network slices 15a-c in the illustrated example).

In more detail, the NSSF (i.e. the second network component) 12 is arranged to obtain a user profile associated with the user ID from a third network component 13, where the user profile comprises a service pattern associated with the user ID. The user ID could have been retrieved from the network slice selection request received by the second network component 12. In the example where the third network component is a NWDAF, it may be enriched such that user specific reports can be also be provided to the requesting consumer functions. In more detail, it is appreciated that NWDAF may further request such user specific reports (or the information needed to prepare these reports) from different network functions available in 5G. For example, data usage pattern might be obtained using the historical data available with a service management function (SMF) (or similar packet core nodes/functions) or with a charging function (CHF) (or similar business support system (BSS) nodes/functions).

Further, in an example scenario the NSSF 12 can request a customized report that indicates historical information about the usage pattern (or service pattern) associated with the user ID. Accordingly, the NWDAF 13 (or more generally, the third network component 13) can be arranged to form a cost factor based on a set of predefined parameters associated with the user ID, the cost factor can in turn be used to create the requested report. The set of predefined parameters may for example be an average data download for the user ID (represented below by D), an average duration of a voice or data session for the user ID (represented below by Ty for voice and Td for data), an average number of voice or data sessions for a time period for the user ID (represented below by Sy for voice and Sd for data), an average latency offered for the user ID (represented below by L), and a type of data session of the user ID, such as e.g. video streaming, VR, gaming, IoT application, etc. (represented below by T). Accordingly, the third network component 13 can be arranged to determine a cost factor based on a function f:

$$\text{Cost Factor} = f(\alpha D, \beta Ty, \gamma Td, \delta Sy, \epsilon Sd, \zeta L, \eta T)$$

Where $\alpha, \beta, \gamma, \delta, \epsilon, \zeta$ and $\eta$ are weighing factors which may be provided based on network operator preferences.

Accordingly, the obtained user profile may comprise the determined cost factor, which in turn is indicative of the service pattern. The cost factor, and more generally, the service pattern can be determined/derived using any suitable statistical function. The statistical function can for example be dependent one or more of the above discussed predefined parameters.

Furthermore, the third network component/function 13 can be arranged to determine a separate cost factor for defined time periods, such as e.g. for each hour of a day. Or stated differently, the obtained user profile may comprise a plurality of service patterns associated with the user ID where each service pattern is further associated with a defined time period for the user ID. This is advantageous since it allow for further optimization in the network slice selection. In more detail, since requirements of the UE can be different at different hours of the day, a network slice suitable for the UE in the morning may be unsuitable in the evening (c.f. mobile device usage while at work and while sleeping). Additionally, or alternatively, day of the week or date of the month can be considered when determining a cost factor.

Thus, the NSSF 12 is further arranged to select a network slice 15a, 15b, 15c from a plurality of network slices for the UE 10 based on the received network slice selection request, the obtained user profile, and the slice characteristic of each network slice 15a, 15b, 15c. Moreover, the NSSF 12 is arranged to send a network slice instance ID to the AMF 11 based on the selected network slice. Stated differently, the NSSF 12 may further utilize the received report (containing the service pattern, e.g. in the form of a cost factor) in combination with the received Requested NSSAI to select the network slice to which UE 10 should be redirected to. In this way, the UE 10 will be allocated to a network slice that is most appropriate to the UE 10 and can ensure the optimum utilization of underlying infrastructure.

Further, in an example scenario, based on the received report, it might be determined by the NSSF 12 that the UE 10 uses extreme data download between 10:00 and 13:00 whereas it is quite idle (in terms of data download) between 15:00 and 18:00. Thus, on receiving a request for allocation/selection of network slice for this UE 10 (i.e. upon receiving the network slice selection request), the NSSF 12 may select the first network slice 15a (whose characteristics define that it is suitable for extreme data download) for the UE during between 10:00 and 13:00. Similarly, the NSSF 12 may select the second network slice 15b (whose characteristics define that it is suitable for low data download requirements) between 15:00 and 18:00. As readily appreciated by the skilled reader data download is just mentioned as an example parameter and other parameters (such as the ones mentioned above) might also be used by NSSF 12 for the selection of network slice 15a, 15b, 15c for the UE 10.

Further, as already exemplified, it is possible to utilize the NWDAF 13 for providing user-specific information (such as the service pattern). However, a separate network function (generally referred to as a third network component) may also be used to provide such information. In this way, instead of enriching the NWDAF with additional data (as per an exemplary embodiment of the present disclosure) an altogether new network function might be provided that will handle this task dedicatedly and the NWDAF may continue to provide network load related information only.

Also, as readily understood by the skilled reader, the three slices for eMBB are just mentioned and illustrated in FIG. 2 to illustrate an example scenario. The proposed disclosure might be utilized for any type of network slice available in a 5G network (e.g. slices dedicated for massive IoT devices, slices dedicated for ultra-reliable low latency devices and so forth).

Figure 3:
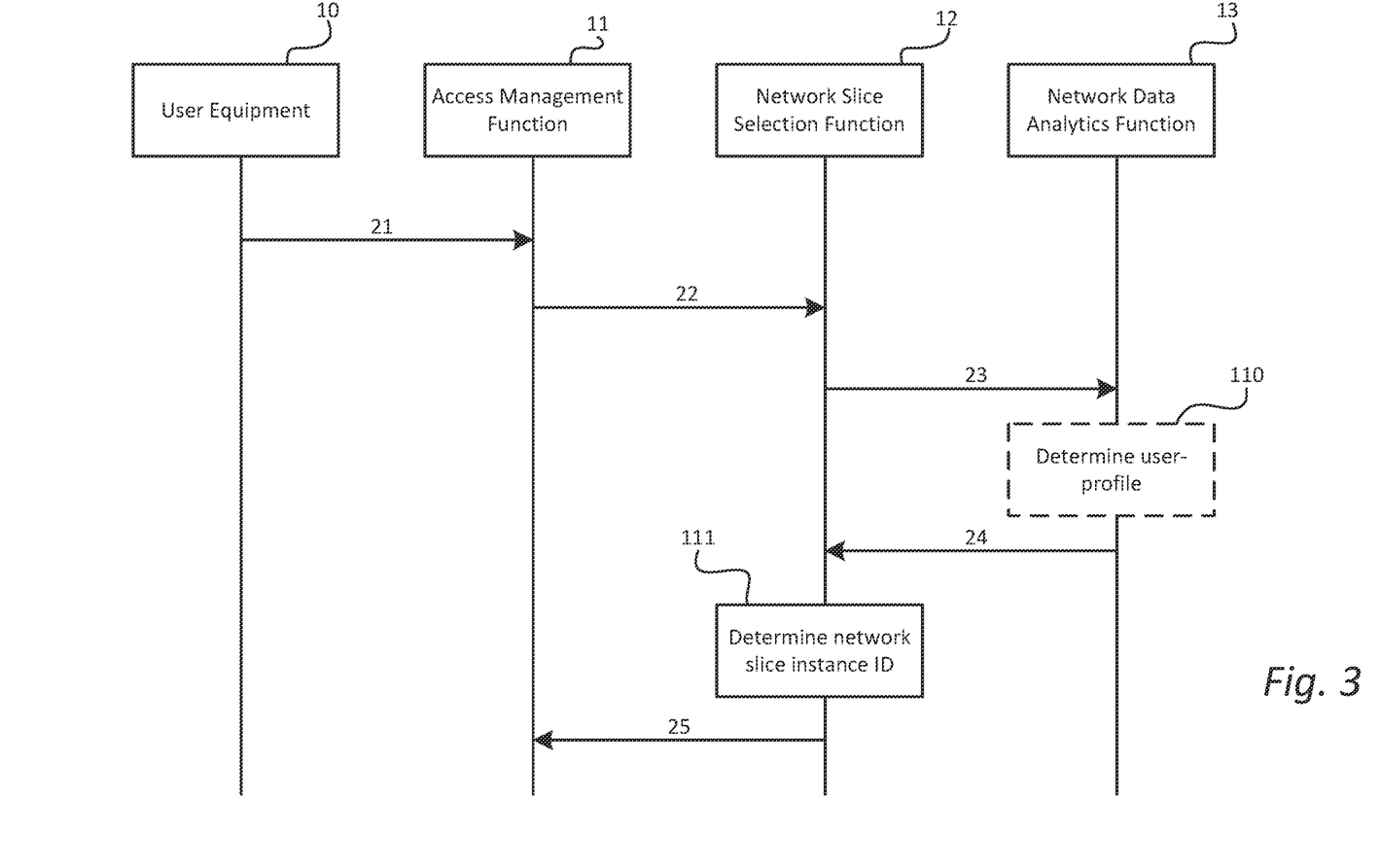
FIG. 3 is a schematic communication sequence diagram representation of a method for selecting a network slice in a wireless telecommunications network having a plurality of network slices according to an embodiment of the present disclosure.

FIG. 3 illustrates a schematic communication sequence diagram representation of a method according to an embodiment of the present disclosure. More specifically, FIG. 3 illustrates additional details regarding the communication between the components/functions shown in FIG. 2. Communicating components (may also be referred to as functions or entities) are shown along the top, with a corresponding vertical line extending downward. Communications are indicated by arrows that extend horizontally from and to the vertical lines corresponding to the components/functions that send and receive the communications. Communications occur in order from top to bottom. Method steps performed or executed by a specific component are indicted by boxes breaking the vertical lines.

Initially, at step 21, the access management function (AMF) 11 receives a network request (e.g. registration request) from a UE 10. As discussed in the foregoing the network request may include requested Network Slice Selection Assistance Information (NSSAI) that includes S-NSSAI. More specifically, S-NSSAI includes information about a preferred network slice of the UE 10. For example, the NSSAI may include a parameter in the form of a slice/service type (SST) that indicates the preference of the network slice selection.

At step 22, the AMF 11 determines that there is a need for contacting the network slice selection function (NSSF) 12 for providing information about network slice instance IDs that should be used for the UE 10. Accordingly, once the AMF 11 determines that it needs to contact the NSSF 12, it passes on the received information from the UE 10 (along with the subscription ID or user ID associated with the UE 10) to the NSSF 12.

Further, at step 23, the NSSF 12 sends a request to the NWDAF 13 to provide a user-profile associated with the user ID (associated with the UE 10). Conventionally, the NSSF 12 may select the network slice on the basis of information included in the NSSAI and the UE 10 would be allocated to the requested slice. However, the requested slice-allocation may not always be optimal from a network utilization perspective nor even from the user perspective, i.e. the UE-based S-NSSAI oftentimes erroneously requests a specific slice, even though there may be other, more suitable alternatives.

Moreover, there might be a significant difference in feature/functions requirements from UE 10 at different interval of times (e.g. different requirements in different hours of the day, different days of the week or different dates of a month). Thus, it was realized by the present inventors to consider the user-profile associated with the user ID while selecting the network slice so that the user may be allocated to a network slice that would be most optimal for it, and optionally even in such detail that it would be the most optimal slice at that specific instant of time. Accordingly, to achieve this, the NSSF 12 requests the usage-profile of the subscriber/user from NWDAF 13. The NSSF 12 may for example send a subscriber ID (e.g. mobile station international subscriber directory number (MSISDN), international mobile subscriber identity (IMSI), session initiation protocol-uniform resource identifier (SIP-URI), network access identifier (NAI), etc.) to the NWDAF 13 to provide such information. NSSF 12 may also specify the time period (e.g. dating back 6 months) for which the user-profile should be provided by the NWDAF 13. The amount of stored historical data/information may however be governed by the operator, and local legislation.

Further, the NWDAF 13 determines 110 the user-profile for the received user ID. Conventionally, the NWDAF 13 is proposed to provide reports related to network load (e.g. load level for a network slice or a specific network slice crossing a threshold). However, according to the present disclosure, the NWDAF 13 (or some other dedicated network component/function) also provides user-specific information to the consumer network functions (in this example the NSSF 12). The NWDAF 13 may fetch the specific information (such as the service pattern) from different network functions in the 5G network that may hold such information. For example, the network session management function (SMF) (not shown) may include information pertaining to data/service usage pattern associated with a user ID. As discussed with reference to FIG. 1, the NWDAF 13 may determine a cost factor based on the different parameters that indicate usage behavior of the user and, based on this cost factor, the NWDAF 13 can be arranged to form the report including the user-profile of the user that is requested by the NSSF 12.

Still further, at step 24, the NWDAF 13 sends the user-profile to the requesting NSSF 12. The user-profile might be in different formats that might be agreed upon between the NSSF 12 and the NWDAF 13. For example, it can be in the format of .csv file, excel file, log file etc. or as already exemplified, it can even be communicated in the form of cost factor itself (i.e. a numerical value).

The NSSF 12 is then arranged to determine 111 a network slice instance ID based on the received 24 information from the NWDAF 13 and based on the received 22 requested NSSAI (from the AMF 11) in the network request message. Stated differently, the NSSF 12 is arranged to correlate the services or features required by the UE 10 with the received 24 information from the NWDAF 13 and accordingly make a decision about the optimum network slice for the user associated with the UE 10. For example, as discussed in the foregoing, if the NSSF 12 determines that the UE 10 requires huge data download or very low latency along with intense data download at a particular point of time, then the slice that exhibits this attribute (i.e. capability to handle high download requirements or capability to handle both, very low latency and high data download) will be selected for that UE 10. Since the NSSF 12 is already aware about the capabilities and feature specific information about the network slices (i.e. network characteristic) that are instantiated in the network (or that may be instantiated, if required), the NSSF 12 is arranged to determine the best suited network slice for the UE 10.

It should be noted that the NSSF 12 may communicate with some different network function also (not shown 2) instead of the NWDAF 13 to fetch user-specific information (the user profile) without deviating from the scope of the disclosure. In such cases, that network function should be capable of getting information related to usage/service pattern associated with the user ID of the requesting UE 10 from the corresponding network functions (e.g. SMF, CHF etc.). In other exemplary embodiments of the present disclosure, the NSSF 12 may also communicate directly with the network functions holding such user-specific information.

At step 25, the NSSF 12 is arranged to provide this information (i.e. the determined network slice instance ID) to the requesting nodes (e.g. to AMF 11) so that UE 10 may be allocated to the selected network slice.

Figure 4:
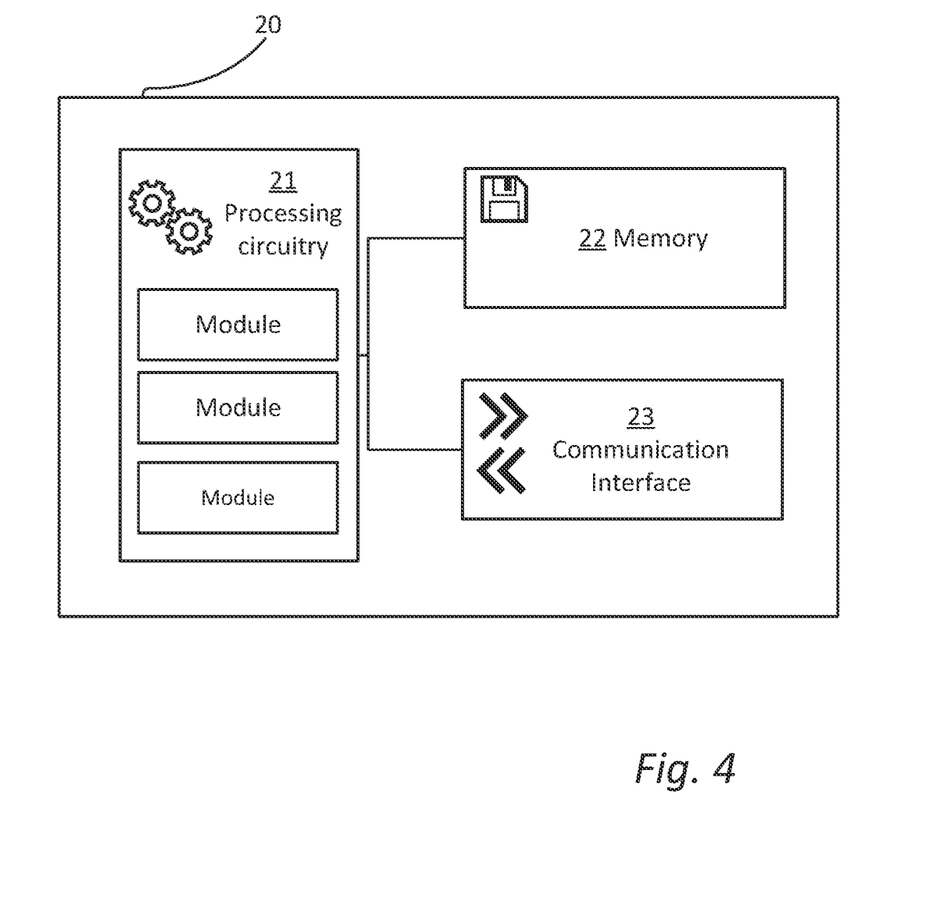
FIG. 4 is a schematic block diagram representation of a network slice selection component according to an embodiment of the present disclosure.

FIG. 4 is a schematic block diagram of a computing device 20 that can be used to implement any one of the various network components/functions as discussed in the foregoing, such as e.g. the network slice selection function (NSSF) (may also be referred to as the network slice selection component). However, the various network components/functions may be implemented by any number of computing devices 20, with the different network functions being distributed in various ways across the computing devices 20.

The computing device 20 has at least one processor (may also be referred to as processing circuitry or processing unit) 21, at least one memory 22, and at least one communication interface 23. The memory may be volatile (such as RAM), non-volatile (such as ROM, flash memory, etc.) or a combination of the two. The memory 21 may further include an operating system, one or more program modules, and program data. The memory 21 may also be in the form of other data storage devices (removable and/or non-removable) such as, for example, magnetic disks, optical disks, or tape.

Non-transitory computer storage media of the computing device 20 may include volatile and non-volatile, removable and non-removable media implemented in any method or technology for storage of information, such as computer readable instructions, data structures, program modules, or other data. The system memory 21 are all examples of computer-readable storage media. Non-transitory computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the processor 21. Any such non-transitory computer-readable storage media may be part of the computing device 20.

In various embodiment, the memory 22 may store programming instructions which, when executed by the processing circuitry 21, implement some or all of the methods described above as being implemented by components of the system 1.

The computing device 30 may also have input device(s) (not shown) such as a keyboard, a mouse, a touch-sensitive display, voice input device, etc. Output device(s) (not shown) such as a display, speakers, a printer, etc. may also be included. The computing device 20 may also contain communication connections that allow the computing device 20 to communicate with other computing devices via the communication interface 23.

The communication interface 23 may comprise a transmitter, a receiver, or a transceiver which are in data communication with other network entities in a telecommunications network and are configured to transmit and receive data accordingly.

The computing device 20 can be implemented as a combination of computer hardware and software. In particular, the processor 21 may include various functions such as e.g. a profile manager, network slice requester, and network slice manager, which may be implemented as software configured to run on the processor 21, or as combinations of hardware and software in separate modules. The memory 22 stores the various programs/executable files that are implemented by a processor 21, and also provides a storage unit for any required data. The programs/executable files stored in the memory 22, and implemented by the processor 21, can include the aforementioned functions such as e.g. the profile manager, network slice requester and network slice manager, but are not limited to such.

User Equipment as the term may be used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. Furthermore, a device may be interpreted as any number of antennas or antenna elements.

Although the description is mainly given for a user equipment, in very general forms, it should be understood by the skilled in the art that "user equipment" is a non-limiting term which means any wireless device, terminal, or node capable of receiving in DL and transmitting in UL (e.g. PDA, laptop, mobile, sensor, fixed relay, mobile relay or even a radio base station, e.g. femto base station).

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a network function, the one or more programs comprising instructions for performing the method according to any one of the above-discussed embodiments. Alternatively, according to another exemplary embodiment a cloud computing system can be configured to perform any of the method aspects presented herein. The cloud computing system may comprise distributed cloud computing resources that jointly perform the method aspects presented herein under control of one or more computer program products.

The processor(s) (associated with the any one of the network components) may be or include any number of hardware components for conducting data or signal processing or for executing computer code stored in memory. The system may have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

In the drawings and specification, there have been disclosed exemplary embodiments. However, many variations and modifications can be made to these embodiments.

Accordingly, although specific terms are employed, they are used in a generic and descriptive sense only and not for purposes of limitation, the scope of the embodiments being defined by the following claims.

The invention claimed is:

1. A method for selecting a network slice in a wireless telecommunications network having a plurality of network slices, each network slice being associated with a defined portion of a core network of the wireless telecommunications network and each network slice having a slice characteristic, the method comprising:
   receiving a network request originating from a user equipment (UE), the network request comprising a user identification (ID) associated with the UE;
   obtaining a user profile associated with the user ID, wherein the user profile comprises a plurality of service patterns associated with the user ID, each service pattern being further associated with a defined time period for the user ID, wherein each service pattern includes an average data download for the user ID, an average duration of a voice or data session for the user ID, an average number of voice or data sessions for a time period for the user ID, or an average latency offered for the user ID; and
   selecting one network slice from the plurality of network slices for the UE based at least partly on a time period associated with the network request, a service pattern associated with the time period and associated with the user ID included in the user profile, and the slice characteristic of each network slice.

2. The method of claim 1, wherein the service pattern comprises a data usage pattern for the user ID.

3. The method of claim 1, wherein the service pattern comprises a type of data session of the user ID.

4. The method of claim 1, wherein the service pattern is derived using a statistical function.

5. The method of claim 1, wherein the service pattern is obtained from a predefined network function.

6. The method of claim 5, wherein the predefined network function is a Network Data Analytics Function (NWDAF) enriched with user history data.

7. The method of claim 5, wherein the predefined network function is arranged to determine a cost factor indicative of the service pattern associated with the user ID, and wherein the user profile comprises the determined cost factor.

8. The method of claim 1, further comprising:
   sending a network slice instance ID to a network component in the wireless telecommunications network based on the network slice.

9. The method of claim 1, further comprising:
   allocating the UE to the network slice.

10. A non-transitory computer-readable having instructions stored therein that are executable by processing circuitry that provides a network function in a wireless telecommunications network having a plurality of network slices, each network slice being associated with a defined portion of a core network of the wireless telecommunications network and each network slice having a slice characteristic, the instructions executable by the processing circuitry to cause the network function to perform operations comprising:
   receiving a network request originating from a user equipment (UE), the network request comprising a user identification (ID) associated with the UE;
   obtaining a user profile associated with the user ID, wherein the user profile comprises a plurality of service patterns associated with the user ID, each service pattern being further associated with a defined time period for the user ID, wherein each service pattern includes an average data download for the user ID, an average duration of a voice or data session for the user ID, an average number of voice or data sessions for a time period for the user ID, or an average latency offered for the user ID; and
   selecting one network slice from a plurality of network slices for the UE based at least partly on a time period associated with the network request, a service pattern associated with the time period and associated with the user ID included in the user profile, and a slice characteristic of each network slice.

11. A network slice selection component comprising:
    at least one communication interface;
    at least one memory; and
    at least one processor;
    wherein the at least one processor is configured to execute instructions stored in the at least one memory to select a network slice in a wireless telecommunications network having a plurality of network slices, each network slice being associated with a defined portion of a core network of the wireless telecommunications network and each network slice having a slice characteristic, wherein execution of the instructions by the at least one processor causes the network slice selection component to perform operations comprising:
       receiving a network request originating from a user equipment (UE), the network request comprising a user identification (ID) associated with UE;
    obtaining a user profile associated with the user ID, wherein the user profile comprises a plurality of service patterns associated with the user ID, each service pattern being further associated with a defined time period for the user ID, wherein each service pattern includes an average data download for the user ID, an average duration of a voice or data session for the user ID, an average number of voice or data sessions for a time period for the user ID, or an average latency offered for the user ID; and
    selecting one network slice from the plurality of network slices for the UE based at least partly on a time period associated with the network request, a service pattern associated with the time period and associated with the user ID included in the user profile, and the slice characteristic of each network slice.

12. The network slice selection component of claim 11 implemented in a network slice selection function (NSSF) of the wireless telecommunications network.

13. The network slice selection component of claim 11 implemented in an access management function (AMF) of the wireless telecommunications network.

14. A wireless telecommunication system comprising:
    a first network component comprising:
       processing circuitry; and
       memory coupled to the processing circuitry and storing instructions that are executable by the processing circuitry to cause the first network component to perform operations comprising:
          receiving a network request from a user equipment (UE), the network request comprising a user ID associated with the UE; and
          sending a network slice selection request to a second network component based on the network request; and the second network component comprising:
  processing circuitry; and
  memory coupled to the processing circuitry and storing instructions that are executable by the processing circuitry to cause the second network component to perform operations comprising:
  receiving the network slice selection request;
  obtaining a user profile associated with the user ID from a third network component, wherein the user profile comprises a plurality of service patterns associated with the user ID, each service pattern being further associated with a defined time period for the user ID, wherein each service pattern includes an average data download for the user ID, an average duration of a voice or data session for the user ID, an average number of voice or data sessions for a time period for the user ID, or an average latency offered for the user ID;
  selecting one network slice from a plurality of network slices for the UE, each network slice being associated with a defined portion of a core network of the wireless telecommunications system and each network slice having a slice characteristic, wherein the selection is based at least partly on a time period associated with the network slice selection request, a service pattern associated with the time period and associated with the user ID included in the user profile, and the slice characteristic of each network slice; and
  sending a network slice instance ID to the first network component based on the network slice.

15. The wireless telecommunication system of claim 14, wherein the service pattern comprises a data usage pattern for the user ID.

16. The wireless telecommunication system of claim 14, wherein the service pattern comprises a type of data session of the user ID.

17. The wireless telecommunication system of claim 14, wherein the service pattern is derived using a statistical function.

18. The wireless telecommunication system of claim 14, wherein the third network component is a Network Data Analytics Function (NWDAF) enriched with user history data.

19. The wireless telecommunication system of claim 14, the instructions being further executable by the processing circuitry to cause the first network component to perform further operations comprising:
  receiving the network slice instance ID from the second network component; and
  allocating the UE to the network slice based on the network slice instance ID.

* * * * *